United States Patent [19]

Roth et al.

[11] 4,125,673
[45] Nov. 14, 1978

[54] PROCESS AND COMPOSITION FOR RENDERING SURFACES HYDROPHOBIC AND OLEOPHOBIC

[75] Inventors: Michael Roth; Herbert Gluck, both of Burghausen, Germany

[73] Assignee: Wacker-Chemie GmbH, Munich, Germany

[21] Appl. No.: 690,682

[22] Filed: May 27, 1976

[30] Foreign Application Priority Data

Jun. 12, 1975 [DE] Fed. Rep. of Germany ....... 2526287

[51] Int. Cl.$^2$ ........................... B05D 3/02; B32B 9/04
[52] U.S. Cl. .............................. 428/447; 260/29.6 F; 260/29.6 R; 427/385 C; 427/387
[58] Field of Search ............... 427/372 R, 372 B, 387, 427/385 C; 52/309, 315, 317; 106/2; 428/447; 260/29.6 F, 29.6 R, 46.5 H

[56] References Cited

U.S. PATENT DOCUMENTS

| | | | |
|---|---|---|---|
| 2,574,168 | 11/1951 | Brick | 427/387 X |
| 3,385,812 | 5/1968 | Brochman | 428/447 X |
| 3,772,065 | 11/1973 | Seiler | 106/2 X |
| 3,849,357 | 11/1974 | Wolf | 52/517 X |
| 3,955,985 | 5/1976 | Bosch et al. | 106/2 |

*Primary Examiner*—Michael R. Lusignan

[57] ABSTRACT

A process for imparting hydrophobic and oleophobic properties to inorganic materials which comprises applying to the inorganic materials a composition containing (a) a solution or dispersion of a fluorine-containing organic polymer or a solution of a water soluble polymer of an unsaturated carboxylic acid and (b) a solution of an organosilicon compound having on the average 0.9 to 1.8 hydrocarbon radicals per silicon atom.

35 Claims, No Drawings

PROCESS AND COMPOSITION FOR RENDERING SURFACES HYDROPHOBIC AND OLEOPHOBIC

The present invention relates to inorganic materials having hydrophobic and oleophobic properties and more particularly, to a process for imparting hydrophobic and oleophobic properties to inorganic materials.

Glass and asbestos surfaces have been rendered hydrophobic and oleophobic by treating them with, for example, a mixture of a solution or dispersion of a fluorine-containing polymer to impart oil repellency and a solution or emulsion containing an organosilicon compound to impart water repellency thereto (see U.S. Pat. No. 3,385,812). The fluorine-containing polymer used consists of fluorine, carbon, hydrogen, oxygen, phosphorus, sulphur or nitrogen atoms, and the organosilicon compound used contains silicon-bonded hydrogen atoms. Organosilicon compounds containing silicon-bonded hydrogen atoms are more difficult to obtain than other conventional organosilicon compounds. Furthermore, organosilicon compounds containing silicon-bonded hydrogen atoms have a tendency to split off hydrogen atoms, thereby enhancing the possibility of an explosion.

Therefore, it is an object of this invention to provide a composition which will impart hydrophobic and oleophobic properties to inorganic materials. Another object of this invention is to provide a composition for rendering inorganic materials hydrophobic and oleophobic which contains an organosilicon compound that is free of silicon-bonded hydrogen atoms. Still another object of this invention is to impart oleophobic and hydrophobic properties to inorganic materials and thereby prevent or at least reduce the rate of migration of salts and other substances to the surface of the inorganic materials. A further object of this invention is to provide improved oil repellent properties to inorganic materials. A still further object of this invention is to provide a process for treating inorganic materials to impart hydrophobic and oleophobic properties thereto.

The foregoing objects and others which will become apparent from the following description are accomplished in accordance with this invention, generally speaking, by treating inorganic materials with component (a) which is a solution or dispersion of a fluorine-containing organic polymer or a solution of a water soluble polymer of an unsaturated carboxylic acid and component (b) which is a solution of an organosilicon compound having on the average of from 0.9 to 1.8 hydrocarbon radicals per silicon atom and the silicon valences which are not satisfied by a hydrocarbon radical are satisfied by an oxygen atom to impart hydrophobic and oleophobic properties thereto.

Surfaces that may be rendered hydrophobic and oleophobic by the process of the invention are surfaces of normally solid inorganic materials. The process is of particular importance for the treatment of materials having open pores, that is pores that are in contact with the surrounding medium. (See E. Uhlein, Rompps Chemisches Worterbuch, Stuttgart 1969, pp. 698–699 for definition of term "open pores"). Examples of inorganic materials having open pores are unglazed porous brickyard products, for example, building bricks (porous), cooperating and non-cooperating ceiling bricks, lightweight bricks, light weight construction plates, tubes, cable protection covers, roof tiles, building terra-cotta and earthenware; unglazed sintered brickyard products, for example, surface clinker bricks, clinker conduits (for water systems), paving clinkers, floor and wall tiles and plates, acid-resistant tiles, split clinker flags, dividing-wall bricks, cell-wall bricks and clinkered building terra-cotta; expanded clay products (Lecca) which are used as structural elements for light-weight construction, and light-weight construction elements; concrete, asbestos cement, mortar, lime sandstone, and natural stone, for example, natural sandstone, travertine and other limestones.

The fluorine-containing organic polymer which may be used in accordance with this invention is one that will impart oil repellency to the surface and consists of fluorine and carbon atoms and, optionally, chlorine and/or hydrogen and/or oxygen and/or sulphur and/or phosphorus and/or nitrogen atoms. Fluorine-containing polymers that have previously been known or used for rendering organic substances, e.g., organic fibres or inorganic substances oleophobic or oil repellent may be used in this invention. Examples of suitable fluorine-containing organic polymers are polytetrafluoroethylene and hexafluoropropylene, copolymers of trifluorochloroethylene and one or more other olefinically unsaturated monomers, such as vinylidene fluoride, vinyl chloride, vinyl acetate, methyl methacrylate, and styrene, fluorinated acrylic resins, e.g., polymers of 1,1-dihydroperfluorobutyl acrylate and copolymers of n-butyl acrylate, N-methylol acrylamide and at least 35 percent by weight of a methacrylate of the formula

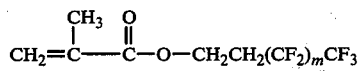

in which $m$ represents an integer from 1 to 13.

The water soluble polymers of unsaturated carboxylic acids which may be used in accordance with this invention are those that have previously been known or used for rendering organic textile materials dirt repellent. Examples of suitable unsaturated carboxylic acids are acrylic acid, methacrylic acid, itaconic acid, vinylacetic acid and fumaric acid. The polymer may be a homopolymer, a copolymer of two or more unsaturated carboxylic acids, or a copolymer of one or more unsaturated carboxylic acids and one or more other olefinically unsaturated monomers, such as for example, an acrylate, styrene, or vinyl chloride.

The fluorine-containing organic polymer may be applied to the surface to be treated in the form of an aqueous dispersion or in the form of a solution or dispersion in an organic liquid diluent. The water soluble polymer of an unsaturated carboxylic acid is used in the form of an aqueous solution. If desired, both a fluorine-containing organic polymer and a water soluble polymer of an unsaturated carboxylic acid may be applied to the surface to be treated.

The amount of fluorine-containing organic polymer and/or water soluble polymer of an unsaturated carboxylic acid in the solution or dispersion is preferably in the range of from 0.05 to 25 percent by weight, and more preferably from 0.5 to 20 percent by weight, based on the weight of the polymer(s) and the solvent or dispersing medium.

The organosilicon compound used to impart water repellency to the material is preferably an alkali metal hydrocarbon siliconate in which the hydrocarbon radical is an alkyl radical having up to 5 carbon atoms or a phenyl radical. Such compounds have the advantage of being readily available and readily soluble in water. The alkali metal hydrocarbon siliconate may be a monomeric compound of the general formula RSi(OH)$_2$OM or a polymeric compound comprising units of the general formula $$\begin{array}{c} R \\ | \\ -Si-O- \\ | \\ OM \end{array}$$

in which formulae, R represents an alkyl radical having up to 5 carbon atoms or a phenyl radical, and M represents an alkali metal atom, preferably a sodium or potassium atom.

The organosilicon compound may also be, for example, an organosilane of the general formula R$^1_n$Si(OR$^2$)$_{4-n}$ in which R$^1$ represents a hydrocarbon radical free of aliphatic unsaturation and having up to 14 carbon atoms, R$^2$ represents an alkyl radical having up to 5 carbon atoms which may be interrupted by ether oxygen and $n$ represents 1, 2 or 3 and has an average value of from 0.9 to 1.8. A partial hydrolysate of such an organosilane, having not more than 10 silicon atoms per molecule, may also be used.

Another organosilicon compound which may be employed is the product obtained from the reaction of a silane of the general formula R$^1_n$SiCl$_{4-n}$ in which R$^1$ and $n$ are the same as above, with ethylene glycol or diethylene glycol.

Still another suitable organosilicon compound which may be employed is an organopolysiloxane having more than 10 silicon atoms per molecule and consisting of units of the general formula R$^1_x$Si(OR$^2$)$_y$(OH)$_z$O$_{(4-x-y-z)/2}$ in which R$^1$ and R$^2$ are the same as above, $x$, $y$ and $z$ represent 0, 1, 2 or 3, the sum of $x + y + z$ does not exceed 3, the average value of $x$ is within the range of from 0.9 to 1.8, preferably from 0.9 to 1.3, the average value of each of $y$ and $z$ is from 0.00 to 0.20, except that at least one $y$ and $z$ has an average value of at least 0.01.

Examples of alkyl radicals represented by R or R$^2$ in any of the above formulae are methyl, ethyl, n-propyl, isopropyl and n-pentyl radicals. An example of an alkyl radical interrupted by an ether oxygen, represented by R$^2$, is a methoxyethyl radical. Examples of hydrocarbon radicals represented by R$^1$ are alkyl radicals, for example, methyl, ethyl, n-propyl, isopropyl, sec-butyl, decyl and tetradecyl radicals; aryl radicals, for example, phenyl radicals; alkaryl radicals, for example, tolyl radicals; and aralkyl radicals, for example, benzyl radicals.

When the organosilicon compound is an alkali metal hydrocarbon siliconate or a water soluble organosilane, the solvent is preferably water or a mixture of water and a water miscible organic solvent. Otherwise, the solvent is preferably an organic solvent, which may be either water miscible or water immiscible. Examples of suitable water miscible solvents are alcohols, for example, ethanol, isopropanol and diacetone alcohol; ketones, for example, acetone and methyl ethyl ketone; and dimethylformamide. Examples of water immiscible solvents are hydrocarbons, for example, toluene, xylene and trimethylbenzene; chlorohydrocarbons, for example, trichloroethylene; esters, for example, ethyl acetate; and ethers, for example, di-n-butyl ether.

The solution of the organosilicon compound preferably contains from 0.01 to 25 percent and more preferably from 0.1 to 10 percent by weight of the organosilicon compound, based on the weight of the organosilicon compound and the solvent.

In treating a surface to impart hydrophobic properties thereto, component (a) which may be a solution or dispersion of the fluorine-containing polymer or a solution of a water soluble polymer of a carboxylic acid and component (b) which is a solution of the organsilicon compound may be applied either in sequence or simultaneously to the surface. When component (a) is applied simultaneously with the application of component (b), the two components may be applied in the form of a mixture. Such a mixture may be in the form of a solution containing the organosilicon compound and the fluorine-containing polymer or the water soluble polymer of a carboxylic acid or in the form of a dispersion containing the fluorine-containing polymer with the organosilicon compound dissolved in the dispersing medium, i.e., as the outer phase of the dispersion. Such a mixture may be prepared simply by mixing the various components in any sequence.

The solutions and/or dispersions used in the present process may contain various additives. Examples of additives which may be present are dispersants, such as protective colloids and emulsifiers; catalysts to promote crosslinking of the organosilicon compounds, such as metal salts, e.g., zinc octoate, or titanium and aluminum alcoholates; organic and inorganic fillers; organic and inorganic pigments; soluble dyestuffs; perfumes; and binders.

The solution or dispersion of the fluorine-containing polymer or the solution of the water soluble polymer of a carboxylic acid is preferably applied to the surface to be rendered oleophobic in an amount of from 1 to 2000 g/m$^2$ and more preferably from 150 to 800 g/m$^2$. The solution of the organosilicon compound is also preferably applied to the surface to be rendered hydrophobic in an amount of from 1 to 2000 g/m$^2$ and more preferably from 150 to 800 g/m$^2$. When the two components (a) and (b) are applied in the form of a mixture, the amount of the mixture applied to the surface to be rendered hydrophobic and oleophobic is preferably from 1 to 1000 g/m$^2$ and more preferably from 80 to 500 g/m$^2$.

It is preferred that the organosilicon compound and the fluorine-containing polymer or the water soluble polymer of a carboxylic acid be applied in a respective weight ratio of from 2:1 to 20:1 and more preferably about 5:1.

The solution(s) and/or dispersion(s) may be applied to the surface to be treated by any technique known in the art for treating a surface of a solid material with a solution or dispersion. The solution(s) or dispersion(s) may be applied, for example, by spraying, casting, coating, rolling or immersing.

All surfaces or portion of only one surface of the material may be treated in accordance with the invention; for example, it is possible to treat only the upper surface of a floor tile.

It is preferred that the two components (a) and (b) be simultaneously applied to the surface to be treated. This may be achieved either by applying them as a mixture or in some other manner, for example by simultaneously spraying them from two or more nozzles. If the two components are not applied simultaneously, it is preferred that the organosilicon solution be applied prior to the application of the other solution or dispersion. This may be applied before and/or after the organosilicon solution has dried. If the solution or dispersion of the fluorine-containing polymer or the solution of the water soluble polymer of a carboxylic acid is applied before the organosilicon solution, it is preferred that an aqueous dispersion of the fluorine-containing polymer or an aqueous solution of the water soluble polymer of a carboxylic acid be used and the organosilicon solution should be applied before the aqueous dispersion or the aqueous solution has dried.

If desired, two or more solutions of an organosilicon compound may be applied to the surface to be treated. Likewise, two or more dispersions and/or solutions of a fluorine-containing polymer, or two or more solutions of a water soluble polymer of a carboxylic acid may be used in accordance with this invention. Also one or more solutions and/or dispersions of the first mentioned polymer and one or more solutions of the second mentioned polymer may be applied to the surface to be treated.

After the various solutions and/or dispersions have been applied to the surface to be treated, the solutions and/or dispersions are dried. The treated surface may be dried at room temperature or it may be accelerated by heating to a temperature up to about 250° C. During the drying step, crosslinking or hardening of the organosilicon compound occurs.

The present process has certain advantages over processes used heretofore for rendering a surface solely oleophobic, in that the water repellency imparted to the surface prevents or at least slows the migration of salts and other substances to the surface of the material, which could impair the appearance or oil repellency of the material. It also has the advantage that the oil repellency achieved by the present process is often better than that achieved by a process which renders a surface solely oleophobic.

The following examples illustrate the process of the invention and compare the results obtained with those obtained from processes known heretofore for rendering a surface solely oleophobic or solely hydrophobic. All parts and percentages are by weight unless otherwise specified.

The water repellency and oil repellency of the treated surfaces in the examples were determined in the following manner unless otherwise specified.

(A) Water repellency

A 0.5 milliliter droplet of water was applied to the treated surface and the time taken for it to disappear, by absorption or evaporation, was measured. The greater the time required for it to disappear, the greater the degree of water repellency.

(B) Oil repellency

A 0.2 milliliter droplet of mineral oil and a 0.2 milliliter droplet of edible oil (available commercially under the name "Mazola") were each applied to the treated surface. The time taken for each drop to be absorbed was measured. The greater the time required for its disappearance, the greater the degree of oil repellency. The diameter of the stain produced on the surface by the mineral oil droplet was also measured. The smaller the diameter, the greater the degree of oil repellency.

The unglazed ceramic plates used in the examples all had open pores except where otherwise specified and in the untreated state had a high oil and water absorption.

EXAMPLE 1

About 350 grams of the following solutions and dispersions were applied to unglazed ceramic plates. The coated plates were air dried at room temperature for 4 days and then their oil repellency and water repellency were determined. The results are illustrated in Table 1.

Table 1

(a) 3.6 percent aqueous solution of potassium methylsiliconate.
(b) 0.25 percent aqueous dispersion of a copolymer of trifluorochloroethylene and vinyl fluoride.
(c) 0.25 percent dispersion of a copolymer of trifluorochloroethylene and vinyl fluoride in a 3.6 percent aqueous solution of potassium methylsiliconate.

| Treatment | Water Absorption | Mineral Oil Absorption | Edible Oil Absorption | Stain Diameter (mm) |
|---|---|---|---|---|
| none* | 5 sec. | 70 min. | 60 min. | 27 |
| (a)* | 270 min. | 12 hours | 12 hours | 17 |
| (b) | 2 min. | 35 hours | 31.5 hours | 11 |
| (c) | 240 min. | 14 days | 12 days | 11 |

*Comparison Examples

EXAMPLE 2

The following solutions and dispersions were applied to unglazed ceramic plates:

(a) 450 grams of the solution of Example 1 (a) and immediately thereafter (within 1 minute) 180 grams of a 4 percent aqueous dispersion of a low molecular weight polymer of 1,1-dihydroperfluorobutyl acrylate.

The following are comparison examples.

(b) 450 grams of the solution of Example 1 (a).

(c) 320 grams of the 4 percent aqueous dispersion of Example 2 (a).

(d) 320 grams of a 10 percent aqueous dispersion of polytrifluorochloroethylene.

The coated plates were dried for 20 minutes at 150° C.

The plates treated according to Examples 2 (a), (c) and (d) were all oil repellent.

The water repellency of the plates were determined by placing the untreated opposite side of each plate about 5 mm deep in a 2 percent aqueous solution of magnesium sulphate. The results of these tests were as follows.

The sides of the plates treated with compositions (a) and (b) were unchanged after 3 days in the solution and remained unchanged on drying. The side of the plate treated with (c) showed small moist spots after 17 hours and exhibited efflorescence of the salt on drying. The side of the plate treated with composition (d) became dark and wet and exhibited efflorescence on drying.

EXAMPLE 3

About 400 grams of the following solutions and dispersions were applied to unglazed ceramic plates. The coated plates were air dried at room temperature for 4 days and their mineral oil repellency properties were then determined. The results are illustrated in Table 2.

Table 2

(a) 1.5 percent aqueous dispersion of polytrifluorochloro-

Table 2-continued (b) 7.5 percent aqueous solution of potassium methylsiliconate dissolved therein.
(c) 1.5 percent aqueous dispersion of polytrifluorochloroethylene.

| Treatment | Mineral Oil Absorption | Stain Diameter (mm) |
|---|---|---|
| (a) | 14 days | 10 |
| (b)* | 22 hours | 12 |
| (c)* | 94 hours | 11 |

*Comparison Examples

Water was quickly absorbed by the plates treated with composition 3 (c), but was repelled by compositions 3 (a) and (b).

EXAMPLE 4

About 125 grams of the following solutions and dispersions were applied to ceramic plates having a water absorption of less than 2.5 percent.

(a) A 10 percent solution of a mixture containing methyltri(methoxyethoxy)silane and n-propyltris(methoxyethoxy)silane (molar ratio 6:3) in a 3:1 mixture of isopropanol and water, and having 0.75 percent of a low molecular weight polymer of 1,1-dihydroperfluorobutyl acrylate dispersed therein.

(b) A 10 percent solution of Example 4 (a), having 1 percent of a copolymer of trifluorochloroethylene and vinyl fluoride dispersed therein.

(c) A 10 percent solution of Example 4 (a), free of the polymeric component.

(d) A 1 percent aqueous dispersion of the copolymer of 4 (b).

The plates were stored in air at room temperature for 4 days and then heated to 150° C. for 10 minutes. The results of the water and oil repellency tests are illustrated in Table 3.

Table 3

| Treatment | Water Absorption | Mineral Oil Absorption | Edible Oil Absorption |
|---|---|---|---|
| (a) | 345 min. | 6 days | 6 days |
| (b) | 230 min. | 6 days | 6 days |
| (c)* | 378 min. | 6 days | 4.5 days |
| (d)* | 15 min. | 6 days | 6 days |
| none* | 10 min. | 13 hours | 12 hours |

*Comparison Examples

EXAMPLE 5

About 200 grams of the following solutions and dispersions were applied to ceramic plates having a water absorption of less than 2.5 percent.

(a) A solution in toluene of 0.3 percent of a low molecular weight polymer of 1,1-dihydroperfluorobutylacrylate and 2.5 percent of an organopolysiloxane consisting of 20 mole percent of dimethylsiloxane units and 80 mole percent of monomethylsiloxane units and containing 8 percent of ethoxy groups and 6 percent of silicon-bonded hydroxy groups.

(b) The solution of Example 5 (a) except that it contains only 0.2 percent of the polymer.

(c) A 5 percent solution in toluene of the organopolysiloxane of (a).

The plates were dried by heating at 150° C. for 25 minutes and then cooled to room temperature. The repellent properties are illustrated in Table 4.

Table 4

| Treatment | Water Absorption | Mineral Oil Absorption | Edible Oil Absorption | Stain Diameter (mm) |
|---|---|---|---|---|
| (a) | 420 min. | 26 days | 26 days | 11 |
| (b) | 410 min. | 23 days | 11 days | 11 |
| (c)* | 436 min. | 7 days | 2 days | 19 |
| none* | 5 min. | 5 days | 1.5 days | 28 |

*Comparison Examples

EXAMPLE 6

Concrete slabs, measuring 20 cm × 20 cm × 4 cm, were formed from a mixture containing 450 parts of white cement, 450 parts of standard sand (grain I-fine), 900 parts of standard sand (grain II — coarse) and 270 parts of water, according to DIN 1164 (December 1958), using a wooden frame and a smooth support. The wooden frames were removed when the concrete had solidified, and after standing for an additional 24 hours the concrete slabs were removed from their respective supports. They were allowed to dry at room temperature for 36 days.

Each slab was then immersed to one-half its height with the smooth side downward for one minute in one of the solutions (a), (b) and (c) of Example 5. About 620 g/m² of solution were absorbed. The slabs were then air dried at room temperature for 5 days.

The treated and untreated surfaces of the slabs were then treated with an aqueous red pigment dispersion from a spray nozzle (commercially available under the name "Plaka"). After 2 days, the sprayed surfaces were treated with toluene in an attempt to remove the discoloration. The discoloration was easily removed from the surfaces treated with solutions (a) and (b), but could not be removed from the surface treated with solution (c) or from the untreated surfaces.

The water repellency of the surface treated according to the invention, solutions (a) and (b), prevented substantial penetration of the aqueous dyestuff and their oil repellency prevented substantial penetration of the dispersant and likewise the pigment.

EXAMPLE 7

Concrete slabs were prepared in accordance with the procedure described in Example 6, except that they were dried for 7 weeks at room temperature instead of 36 days.

Two slabs each were then immersed to one-half its height for one minute in the following solutions:

(a) The solution of Example 5 (a) except that it contains 0.5 percent of the polymer and 1.25 percent of the organopolysiloxane.

(b) The solution of Example 5 (a) except that it contains 0.33 percent of the polymer and 2.6 percent of the organopolysiloxane.

(c) The solution of Example 5 (a) except that it contains 0.25 percent of the polymer and 3.0 percent of the organopolysiloxane.

Comparison Example (d) The solution of Example 5 (b).

About 600 g/m² of solution were absorbed by each slab.

Each of the above solutions was applied to one side of each of two roof tiles (unglazed brickyard products with a porous body) and to one side of each of two asbestos cement slabs. About 500 g/m² of solution were used on the roof tiles and about 150 g/m² of solution on the asbestos cement slabs.

One of each pair of the building materials was then stored for 4 weeks at room temperature and protected from weathering. The other was exposed at an inclination of 45° to the weather in Burghausen, Oberbayers, Germany for 4 weeks, immediately after the application of the respective solutions.

The treated and untreated surfaces of all of the tiles and slabs were subsequently written on using a felt-tip pen (commercially available under the name "Edding"). After 24 hours, the writing on each surface was rubbed with a piece of paper soaked in toluene. The writing on all surfaces treated with solutions (a), (b) and (c) were easily removed, irrespective of the material and the weathering conditions. The writing could not be removed from the untreated surfaces nor from the surface treated with solution (d), again irrespective of the material and the weathering conditions.

EXAMPLE 8

Unglazed ceramic plates were coated in the following manner:

(a) 450 grams of the solution of Example 1 (a) were applied, and the coating was dried at 150° C. for 25 minutes. After cooling to room temperature, 330 grams of the solution of Example 7 (c) were applied, and the coating was dried at 150° C. for 10 minutes.

(b) 450 grams of the solution of Example 1 (a) were applied. Within 1 minute of the first application and while the coating was still wet, 70 grams of the dispersion of Example 1 (b) were applied and the plates were then dried for 10 minutes at 150° C.

Comparison Example (c) 450 grams of the solution of Example 1 (a) were applied, and the coating was dried at 150° C. for 25 minutes.

All the treated surfaces were found to be water repellent.

A few drops of mineral oil and of edible oil were applied to each treated surface and then removed after 6 hours by means of absorbent paper. The surface treated according to (c) had a dark stain showing that it was not oil repellent, whereas no marks appeared on the surfaces treated according to (a) and (b).

Although specific examples of the invention have been herein described, it is not intended to limit the invention solely thereto, but to include all the modifications falling within the spirit and scope of the appended claims.

We claim:

1. A process for imparting hydrophobic and oleophobic properties to surfaces of bricks or tiles consisting of an inorganic material having open pores, which comprises applying to the surface component (a) which is selected from the class consisting of a fluorine-containing organic polymer and a water soluble polymer of an unsaturated carboxylic acid and a diluent, and component (b) which is a solution of an organosilicon compound having an average of from 0.9 to 1.8 hydrocarbon radicals per silicon atom and any unsatisfied silicon valences are satisfied by an oxygen atom, said organosilicon compound is selected from the group consisting of (i) monomeric hydrocarbon siliconates of the formula $RSi(OR)_2OM$, and polymeric siliconates thereof having units of the formula $$-\underset{\underset{OM}{|}}{\overset{\overset{R}{|}}{Si}}O-$$

(ii) organosilanes of the formula $R^1_n Si(OR^2)_{4-n}$, and partial hydrolyzates thereof having not more than 10 silicon atoms per molecule, (iii) an organopolysiloxane containing more than 10 carbon atoms per molecule and consisting of units of the formula $R^1_x Si(OR^2)_y(OH)_z O_{\frac{4-x-y-z}{2}}$, and (iv) a product obtained from the reaction of a silane having the formula $R^1_n SiCl_{4-n}$ and a glycol selected from the class consisting of ethylene glycol and diethylene glycol, in which M is an alkali metal, R is selected from the class consisting of an alkyl radical having up to 5 carbon atoms and a phenyl radical, $R^1$ is a hydrocarbon radical free of aliphatic unsatruation having up to 14 carbon atoms, $R^2$ is an alkyl radical having up to 5 carbon atoms which may be interrupted by ether oxygen, n represents 1, 2 or 3 and has an average of from 0.9 to 1.8, x, y and z represent 0, 1, 2 or 3, the sum of $x+y+z$ is up to 3, with the average value of x being 0.9 to 1.8 and the average values of y and z is from 0.00 to 0.20 except that at least one y and z has an average value of at least 0.01.

2. Bricks or tiles consisting of an inorganic material having open pores treated in accordance with the process of claim 1.

3. The process of claim 1, wherein the fluorine-containing organic polymer contains fluorine and carbon atoms.

4. The process of claim 3, wherein the fluorine-containing organic polymer also contains groups selected from the class consisting of chlorine, hydrogen, oxygen, sulphur, phosphorus and nitrogen atoms.

5. The process of claim 1, wherein the fluorine-containing organic polymer is selected from the class consisting of polytetrafluoroethylene, polytrifluorochloroethylene, a copolymer of tetrafluoroethylene and hexafluoropropylene, a copolymer of trifluorochloroethylene and at least one olefinically unsaturated monomer, a fluorinated acrylic resin, a copolymer of n-butyl acrylate, N-methylol acrylamide and at least 35 percent by weight of a methacrylate of the formula $$CH_2=\underset{\underset{CH_3}{|}}{C}-\underset{\underset{}{\overset{\overset{O}{||}}{C}}}-O-CH_2CH_2(CF_2)_mCF_3$$

in which m represents an integer of from 1 to 13.

6. The process of claim 1, wherein component (a) is an aqueous dispersion of the fluorine-containing organic polymer.

7. The process of claim 1, wherein the diluent of component (a) is an organic solvent for the fluorine-containing organic polymer.

8. The process of claim 1, wherein the diluent of component (a) is a dispersant for the fluorine-containing organic polymer.

9. The process of claim 1, wherein the water soluble polymer of a carboxylic acid is a polymer having at least one monomer selected from the class consisting of acrylic acid, methacrylic acid, itaconic acid, vinylacetic acid and fumaric acid.

10. The process of claim 1, wherein component (a) is an aqueous solution of the water soluble polymer of a carboxylic acid.

11. The process of claim 1, wherein component (a) is present in an amount of from 0.05 to 25 percent by weight, based on the weight of the polymer and the diluent.

12. The process of claim 1, wherein the organosilicon compound is an alkali metal hydrocarbon siliconate in which the hydrocarbon radical is selected from the class consisting of an alkyl radical having up to 5 carbon atoms and a phenyl radical.

13. The process of claim 12, wherein the alkali metal hydrocarbon siliconate is selected from the class consisting of a monomeric compound of the general formula $$RSi(OH)_2OM$$

and a polymeric compound having units of the general formula $$\begin{array}{c} R \\ | \\ -Si-O- \\ | \\ OM \end{array}$$

in which R is selected from the class consisting of an alkyl radical having up to 5 carbon atoms and a phenyl radical and M represents an alkali metal atom.

14. The process of claim 13, wherein M is selected from the class consisting of a sodium and potassium atom.

15. The process of claim 1, wherein the organosilicon compound is selected from the group consisting of an organosilicon of the general formula $$R^1{}_nSi(OR^2)_{4-n}$$

in which $R^1$ represents a hydrocarbon radical having up to 14 carbon atoms which is free of aliphatic unsaturation, $R^2$ is selected from the class consisting of an alkyl radical having up to 5 carbon atoms and alkyl radicals interrupted by an ether oxygen, $n$ is 1, 2 or 3 and has an average value of from 0.9 to 1.8 and a partial hydrolysate of said organosilane having up to 10 silicon atoms per molecule.

16. The process of claim 1, wherein the organosilicon compound is the reaction product of a silane of the general formula $$R^1{}_nSiCl_{4-n}$$

in which $R^1$ represents a hydrocarbon radical having up to 14 carbon atoms which is free of aliphatic unsaturation and $n$ is 1, 2 or 3 and a glycol selected from the class consisting of ethylene glycol and diethylene glycol.

17. The process of claim 1, wherein the organosilicon compound is an organopolysiloxane having at least 10 silicon atoms per molecule and consisting of units of the general formula $$R^1{}_xSi(OR^2)_y(OH)_zO_{(4-x-y-z)/2}$$

in which $R^1$ represents a hydrocarbon radical having up to 14 carbon atoms which is free of aliphatic unsaturation, $R^2$ is selected from the class consisting of an alkyl radical having up to 5 carbon atoms and alkyl radicals interrupted by an ether oxygen, $x$, $y$ and $z$ are 0, 1, 2 or 3, the sum of $x + y + z$ is up to 3, the average value of $x$ is from 0.9 to 1.8, the average value of $y$ and $z$ is from 0.00 to 0.20 except that at least one $y$ and $z$ has an average value of at least 0.01.

18. The process of claim 12, wherein the organosilicon compound is dissolved in a diluent selected from the class consisting of water and a mixture of water and a water miscible organic solvent.

19. The process of claim 15, wherein the organosilicon compound is dissolved in an organic solvent.

20. The process of claim 1, wherein the organosilicon compound is present as a solution in component (b) in an amount of from 0.01 to 25 percent by weight, based on the weight of the organosilicon compound and the solvent.

21. The process of claim 1, wherein component (b) and component (a) are applied in a respective weight ratio of from 2:1 to 20:1.

22. The process of claim 1, wherein component (a) is applied to the surface in an amount of form 1 to 2000 g/m².

23. The process of claim 1, wherein component (a) is applied to the surface in an amount of from 150 to 800 g/m².

24. The process of claim 1, wherein component (b) is applied to the surface in an amount of from 1 to 2000 g/m².

25. The process of claim 1, wherein component (b) is applied to the surface in an amount of from 150 to 800 g/m².

26. The process of claim 1, wherein component (a) and component (b) are applied simultaneously.

27. The process of claim 26, wherein component (a) and component (b) are applied as a mixture.

28. The process of claim 27, wherein the mixture of component (a) and component (b) is applied to the surface in an amount of from 1 to 1000 g/m².

29. The process of claim 27, wherein the mixture of component (a) and component (b) is applied to the surface in an amount of from 80 to 500 g/m².

30. The process of claim 1, wherein component (b) is applied before component (a).

31. The process of claim 1, wherein component (b) is applied after component (a) but before component (a) has dried.

32. The process of claim 1, wherein, subsequent to their application, the two components are dried at a temperature up to 250° C.

33. The process of claim 5, wherein the fluorine-containing polymer is polytrifluorochloroethylene.

34. The process of claim 12, wherein the alkali metal hydrocarbon siliconate is potassium methyl siliconate.

35. The process of claim 34, wherein the potassium methyl siliconate is dissolved in water.

* * * * *